United States Patent
Sethi et al.

(10) Patent No.: US 12,229,545 B2
(45) Date of Patent: Feb. 18, 2025

(54) METHOD FOR EFFICIENT ENERGY CONSERVATION ON SYSTEM UPGRADE/UPDATE

(71) Applicant: Dell Products L.P., Round Rock, TX (US)

(72) Inventors: Parminder Singh Sethi, Ludhiana (IN); Malathi R, Madurai (IN); Shelesh Chopra, Bangalore (IN); Lakshmi Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 193 days.

(21) Appl. No.: 17/722,875

(22) Filed: Apr. 18, 2022

(65) Prior Publication Data
US 2023/0333834 A1 Oct. 19, 2023

(51) Int. Cl.
| | |
|---|---|
| G06F 8/65 | (2018.01) |
| G06F 1/3206 | (2019.01) |
| G06F 8/71 | (2018.01) |
| G06F 9/445 | (2018.01) |
| G06F 9/455 | (2018.01) |

(52) U.S. Cl.
CPC .............. *G06F 8/65* (2013.01); *G06F 1/3206* (2013.01); *G06F 8/71* (2013.01); *G06F 9/44505* (2013.01); *G06F 9/455* (2013.01)

(58) Field of Classification Search
CPC .......... G06F 8/65; G06F 8/71; G06F 9/44505; G06F 9/455; G06F 1/3206
See application file for complete search history.

(56) References Cited

U.S. PATENT DOCUMENTS

| | | | |
|---|---|---|---|
| 7,472,385 B2 | 12/2008 | Chamberlain et al. | |
| 7,590,981 B2 | 9/2009 | Gupta et al. | |
| 8,078,448 B1 | 12/2011 | Wohlberg et al. | |
| 8,533,608 B1 | 9/2013 | Tantiprasut | |
| 9,086,941 B1 | 7/2015 | Siegel | |
| 10,805,171 B1 | 10/2020 | Anwer et al. | |

(Continued)

FOREIGN PATENT DOCUMENTS

KR  102312735 B1  10/2021

OTHER PUBLICATIONS

Fornadel, Estimation of Legacy Application Upgrade Time using Evolutionary Approach, Nov. 2013, 14th IEEE International Symposium on Computational Intelligence and Informatics, pp. 493-498, (6 pages).

(Continued)

*Primary Examiner* — Lewis A Bullock, Jr.
*Assistant Examiner* — Theodore E Hebert
(74) *Attorney, Agent, or Firm* — Aly Z. Dossa; Chamberlain, Hrdlicka, White, Williams & Aughtry

(57) ABSTRACT

Various embodiments of the invention may receive information related to a plurality of application upgrades from an application monitoring agent. Based on the received information, a device emulation will be requested, and an emulation will be performed in response to generate an application upgrade strategy that includes such things as emulated (e.g., predicted) upgrade times. The application upgrade strategy is used to produce a more refined upgrade strategy. The various embodiments refine the upgrade strategy by specifically consider the power consumption and cost for the power that is consumed.

11 Claims, 7 Drawing Sheets

(56) References Cited

U.S. PATENT DOCUMENTS

| | | | |
|---|---|---|---|
| 11,341,233 B2 | 5/2022 | Shantharam et al. | |
| 11,436,330 B1 | 9/2022 | Jennings et al. | |
| 11,635,973 B2 | 4/2023 | Sethi et al. | |
| 11,695,274 B1 | 7/2023 | Lemsaddek et al. | |
| 2008/0148268 A1 | 6/2008 | Hirouchi | |
| 2008/0281833 A1 | 11/2008 | Cain et al. | |
| 2011/0113224 A1 | 5/2011 | Isshiki et al. | |
| 2011/0270959 A1 | 11/2011 | Schlusser et al. | |
| 2012/0227036 A1 | 9/2012 | Crk et al. | |
| 2015/0007155 A1* | 1/2015 | Hoffman | G06F 8/65 717/168 |
| 2015/0278219 A1 | 10/2015 | Phipps | |
| 2016/0162280 A1 | 6/2016 | Murayama et al. | |
| 2016/0350098 A1* | 12/2016 | Kuchibhotla | G06F 8/65 |
| 2017/0322826 A1 | 11/2017 | Furuhashi et al. | |
| 2018/0113728 A1 | 4/2018 | Musani et al. | |
| 2018/0152341 A1 | 5/2018 | Maeda et al. | |
| 2018/0275982 A1* | 9/2018 | Hunt | H04W 4/70 |
| 2019/0196938 A1 | 6/2019 | Mathen et al. | |
| 2019/0327154 A1 | 10/2019 | Sahoo et al. | |
| 2020/0013014 A1 | 1/2020 | Miller | |
| 2020/0104113 A1 | 4/2020 | Grill et al. | |
| 2020/0156243 A1 | 5/2020 | Ghare et al. | |
| 2021/0034350 A1 | 2/2021 | Chen et al. | |
| 2021/0048996 A1 | 2/2021 | Marzorati et al. | |
| 2021/0124672 A1 | 4/2021 | Abdelhalim et al. | |
| 2021/0149658 A1 | 5/2021 | Cannon et al. | |
| 2021/0326196 A1 | 10/2021 | Moss | |
| 2021/0382936 A1 | 12/2021 | Tomar | |
| 2021/0397432 A1* | 12/2021 | Le | G06F 8/65 |
| 2022/0215004 A1 | 7/2022 | Jakubovitz et al. | |
| 2022/0308856 A1* | 9/2022 | Kim | G06F 8/71 |
| 2022/0350588 A1* | 11/2022 | Liao | G06N 20/00 |
| 2022/0365771 A1* | 11/2022 | Shelke | G06F 11/0793 |
| 2022/0382722 A1 | 12/2022 | Mahna et al. | |
| 2022/0398117 A1* | 12/2022 | Sethi | G06F 9/45508 |
| 2023/0112710 A1 | 4/2023 | Huang et al. | |
| 2023/0185558 A1 | 6/2023 | Sethi et al. | |

OTHER PUBLICATIONS

KR 102312735 English Translation, Oct. 14, 2021, 19 pages.

* cited by examiner

METHOD FOR EFFICIENT ENERGY CONSERVATION ON SYSTEM UPGRADE/UPDATE

BACKGROUND

Computing devices in a system may include any number of internal components such as processors, memory, and persistent storage. The computing devices may execute applications (e.g., software) which may need to be upgraded periodically to protect from security vulnerabilities and to add new or improved features. However, performing the upgrades in a large system with multiple processors and storage devices may require more than a one-size fits all strategy for performing the upgrade.

SUMMARY

In general, certain embodiments described herein relate to a method for upgrading a client device. The method comprises obtaining, by a device emulation orchestration engine in a device emulation system, an upgrade request associated with an application upgrade on the client device. In response to the upgrade request, the device emulation orchestration engine performs a device emulation analysis to determine an application update strategy for the application upgrade, wherein the application update strategy comprises an upgrade estimate time. The device emulation orchestration engine then uses the upgrade estimate times to perform an energy use calculation for the client device to generate a projected energy consumption. The method then initiates the application upgrade strategy on the client device when the projected energy consumption is less than a threshold.

In general, certain embodiments described herein relate to a non-transitory computer readable medium comprising computer readable program code. When executed by a computer processor the computer readable program code enables the computer processor to perform a method for upgrading a client device. The method comprises obtaining, by a device emulation orchestration engine in a device emulation system, an upgrade request associated with an application upgrade on the client device. In response to the upgrade request, the device emulation orchestration engine performs a device emulation analysis to determine an application update strategy for the application upgrade, wherein the application update strategy comprises an upgrade estimate time. The device emulation orchestration engine then uses the upgrade estimate times to perform an energy use calculation for the client device to generate a projected energy consumption. The method then initiates the application upgrade strategy on the client device when the projected energy consumption is less than a threshold.

In general, certain embodiments described herein relate to a system. The system includes a client device, a client device upgrade manager, and a device emulation system. At least, the device emulation system includes at least one processor and a memory comprising instructions, which when executed by the at least one processor, performs a method. The method comprises obtaining, by a device emulation orchestration engine in a device emulation system, an upgrade request associated with an application upgrade on the client device. In response to the upgrade request, the device emulation orchestration engine performs a device emulation analysis to determine an application update strategy for the application upgrade, wherein the application update strategy comprises an upgrade estimate time. The device emulation orchestration engine then uses the upgrade estimate times to perform an energy use calculation for the client device to generate projected energy consumption. The method then initiates the application upgrade strategy on the client device when the projected energy consumption is less than a threshold.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
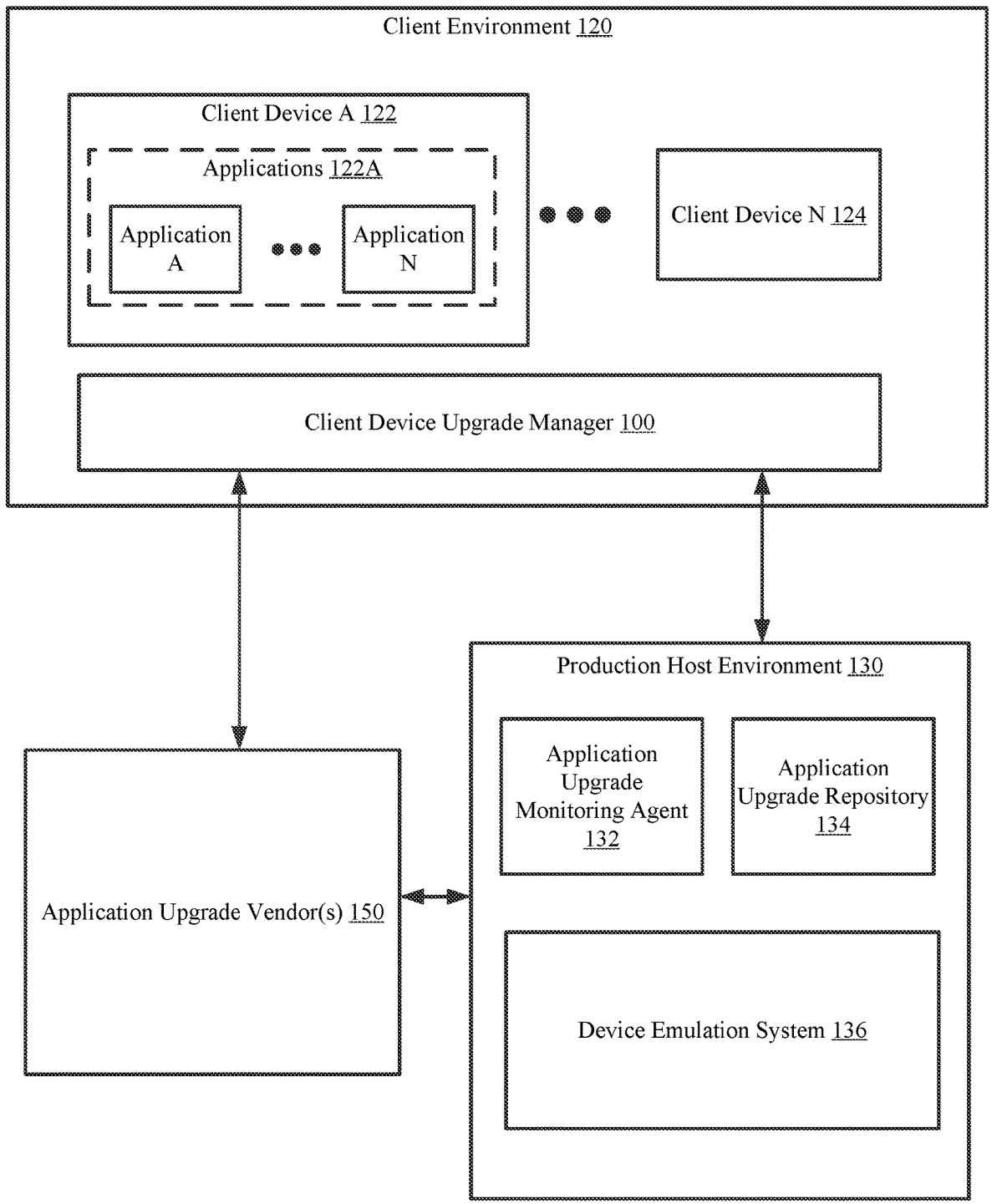
FIG. 1 shows a diagram of a system in accordance with one or more embodiments of the invention.

Specific embodiments will now be described with reference to the accompanying figures.

In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Electronic devices and computing systems often require frequent software or firmware updates or upgrades. The upgrades often require significant resources and/or time to be performed. Electronic devices and computing systems are often complex and comprised of multiple components that may originate from more than one manufacturer and use a plethora of applications/software from yet further providers and/or manufacturers. Since the upgrades can come from both the manufacturer and other third parties, it is difficult to predict how any one upgrade will perform and how much time/resources will be needed for a specific upgrade. To overcome this, in general, one or more of the embodiments of the invention are directed to determine an upgrade strategy, which takes into account the device's configuration, specifics of the software/application update, and the power consumption/price for performing the upgrade strategy.

More specifically, various embodiments of the invention may receive information related to a plurality of application upgrades from an application monitoring agent. Based on the received information, a device emulation will be requested, and an emulation will be performed in response to generate an application upgrade strategy that includes such things as emulated (e.g., predicted) upgrade times. The application upgrade strategy is used to produce a more refined upgrade strategy. The various embodiments refine the upgrade strategy by specifically considering the power consumption and cost for the power that is consumed.

In response to the upgraded strategy as well as user or administrator feedback, the final application upgrade strategy will be initiated (e.g., instantiated, executed, etc.). This advantageously allows for the upgrade process to be customized to a particular electronic device/system resulting in less inconvenience and costs with performing the upgrade. One or more embodiments of the invention further provide the advantage of allowing a user or administrator to have a much clearer view about the upgrade process and allow them to customize both the upgrade and the system. These and other features of the various embodiments of the invention will increase the likelihood that an upgrade will be performed and completed successfully in a timely manner.

The following describes various embodiments of the invention.

FIG. 1 shows a diagram of a system in accordance with one or more embodiments of the invention. The system includes a client environment (120), one or more application upgrade vendors (150), and a production host environment (130). The system may include additional, fewer, and/or different components without departing from scope of the invention. Each component may be operably connected to any of the other components via any combination of wired and/or wireless connections. Each component illustrated in FIG. 1 is discussed below.

In one or more embodiments of the invention, the client environment (120) may include client devices (client device A (122), client device N (124)) and a client device upgrade manager (100). The client devices (client device A (122), client device N (124)) and the client device upgrade manager (100) may be physical or logical devices, as discussed below.

In one or more embodiments of the invention, each client device (client device A (122), client device N (124)) may include one or more applications (122A). As shown in FIG. 1, the applications (122A) may include application A to application N. The applications (122A) may be logical entities executed using computing resources (not shown) of the client devices (client device A (122), client device N (124)). Each of the applications (122A) may perform similar or different processes. In one or more embodiments of the invention, the applications (122A) may provide services to users (e.g., clients (not shown)) of the client devices (client device A (122), client device N (124)). For example, the applications (122A) may host services and/or components. The services and/or components may be, for example but are not limited to instances of databases, email servers, etc. The applications (122A) may host other types of services and/or components without departing from the scope of the invention.

Figure 4:
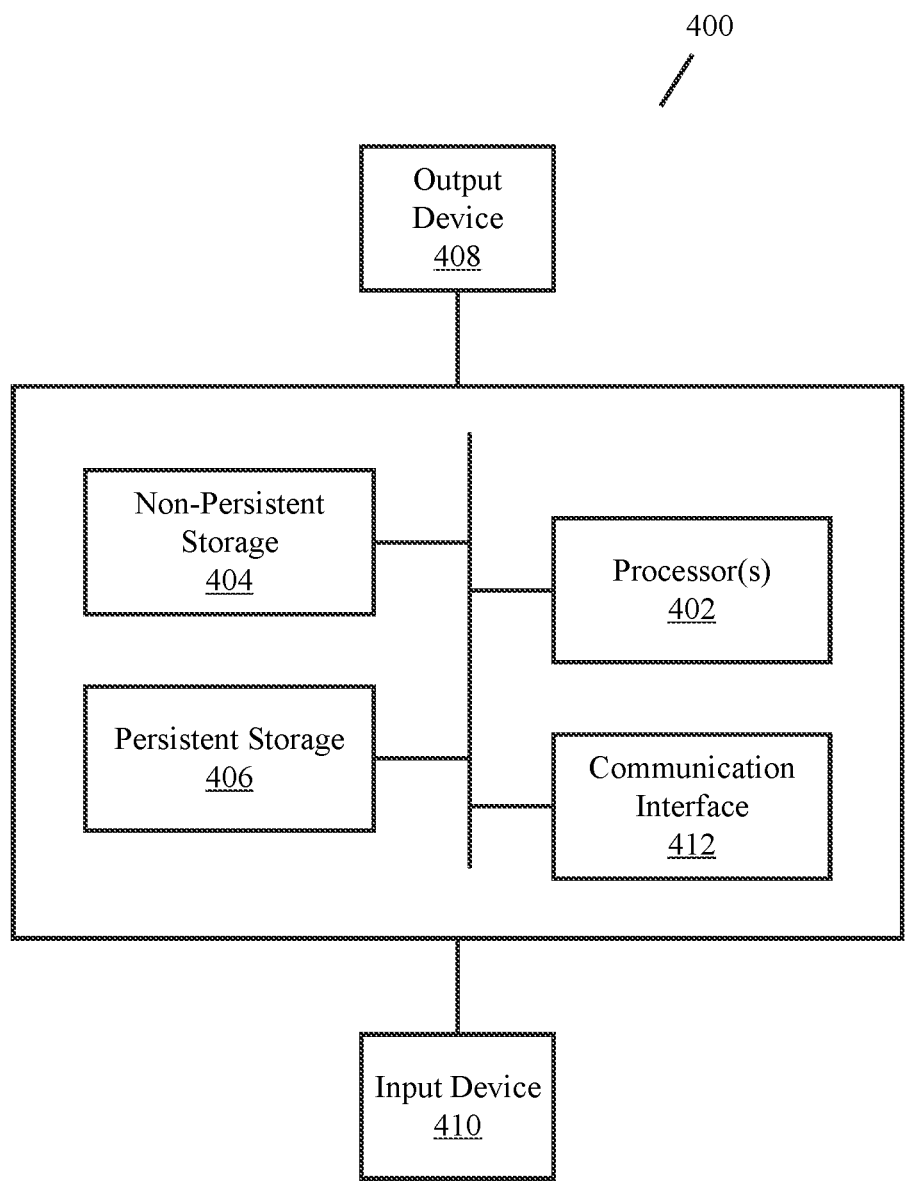
FIG. 4 shows a diagram of a computing device in accordance with one or more embodiments of the invention.

In one or more embodiments of the invention, each client device (client device A (122), client device N (124)) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client device (client device A (122), client device N (124)) described throughout this application.

Alternatively, in one or more embodiments of the invention, each client device (client device A (122), client device N (124)) may be implemented as a logical device. The logical device may utilize the computing resources of any number of computing devices to provide the functionality of each client device (client device A (122), client device N (124)) described throughout this application.

In one or more embodiments of the invention, the applications (122A) may be upgraded based on newer versions available for installation. The installation of application upgrades may be performed and/or otherwise initiated by the client device upgrade manager (100). The client device upgrade manager (100) may also periodically collect information (e.g., client device state and configuration information) from the client devices (client device A (122), client device N (124)).

In one or more embodiments of the invention, the applications (122A) may be implemented as computer instructions, e.g., computer code, stored on a persistent storage that when executed by a processor(s) of a computing device cause the computing device (e.g., 400, FIG. 4) to provide the functionality of the applications (122A) described throughout this application.

In one or more embodiments of the invention, the client device upgrade manager (100) may then send this information to the application vendor(s) (150) for technical support (e.g., recommendations and/or fixes for hardware and/or software failures) to the client devices (client device A (122), client device N (124)). The client device upgrade manager (100) may also identify the client devices (client device A (122), client device N (124)) that require an application upgrade. The application vendor(s) (150) may then provide one or more catalog files (described in more detail below) that specify the requirements of the identified client devices (client device A (122), client device N (124)) to the production host environment (130).

In one or more embodiments of the invention, the client device upgrade manager (100) may obtain the estimated time that one or more application upgrades may take. The client device upgrade manager (100) may obtain the application upgrade time estimation from the production host environment (130). The client device upgrade manager (100) may then provide the application upgrade time estimation and optimal time slots in which the application upgrade may be performed to the identified client devices (client device A (122), client device N (124)).

In one or more embodiments of the invention, the client device upgrade manager (100) may further include functionality of monitoring device configuration information of the client devices (client device A (122), client device N (124)). The device configuration information of the client devices (client device A (122), client device N (124)) may include, but it is not limited to: operating system information of a client device, the number of applications already installed to a client device, current versions of such applications already installed to a client device, processing power of a client device, etc. The device configuration information of the client devices (client device A (122), client device N (124)) may be provided to the production host environment (130).

The device configuration information of the client devices (client device A (122), client device N (124)) may also include other details without departing from the scope of the invention.

In one or more embodiments of the invention, the client device upgrade manager (100) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application.

Alternatively, in one or more embodiments of the invention, similar to the client devices (client device A (122), client device N (124)), the client device upgrade manager (100) may also be implemented as a logical device, as discussed above.

Turning back to the production host environment (130), in one or more embodiments of the invention, the production host environment (130) may include an application monitoring agent (132), an application upgrade repository (134), and a device emulation system (136). The production host environment (130) may include additional, fewer, and/or different components without departing from the scope of the invention.

In one or more embodiments of the invention, the production host environment (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

Alternatively, in one or more embodiments of the invention, similar to the client devices (client device A (122), client device N (124)), the production host environment (130) may also be implemented as a logical device, as discussed above.

In one or more embodiments of the invention, the application upgrade repository (134) may store versions of the application upgrade(s). The application upgrade repository (134) may be updated by the application vendor(s) (150) based on newer versions of the application upgrade(s) being available. The application upgrade repository (134) may further store catalog files related to the application upgrade(s) to be installed. The catalog files may include, for example, but are not limited to a compatible device model, a minimum application version for the application upgrade to be installed, a compatible operating system (and corresponding version of such operating system), an upgrade sequence, etc.

In one or more embodiments of the invention, the application monitoring agent (132) may push the application upgrade(s) to the client device upgrade manager (100). The application upgrade monitoring agent (132) may also obtain a list of the client devices (client device A (122), client device N (124)) that are managed by the client device upgrade manager (100). The application upgrade monitoring agent (132) may further obtain the information related to the application(s) already installed to those client devices (client device A (122), client device N (124)) from the client device upgrade manager (100).

In one or more embodiments of the invention, the application upgrade monitoring agent (132) may monitor the application upgrade repository (134) to identify the application upgrade(s) available in the application upgrade repository (134). The application upgrade monitoring agent (132) may then identify one or more client devices (client device A (122), client device N (124)) that are compatible with the application upgrade based on the catalog files related to the application upgrade in the application upgrade repository (134).

In one or more embodiments of the invention, in response to an emulated application upgrade (e.g., an emulation of an application upgrade that is to be performed on an emulated client device (e.g., device A emulation (224), described below in reference to FIG. 2)), the application monitoring agent (132) may initiate an estimation of performing the application upgrade on one or more of the client devices (client device A (122), client device N (124)). The application upgrade estimation(s) may then be provided to the client device upgrade manager (100).

In one or more embodiments of the invention, the application upgrade monitoring agent (132) may further send information related to the application upgrade to a device emulation orchestration engine (e.g., 210, FIG. 2), which is part of the device emulation system (136). In one or more embodiments of the invention, the information related to the application upgrade may include, but it is not limited to: application version of an application upgrade, supported operating system version(s) for an application upgrade, etc. The information related to the application upgrade may also include other details without departing from the scope of the invention.

In one or more embodiments of the invention, the application monitoring agent (132) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application monitoring agent (132) described throughout this application.

Alternatively, in one or more embodiments of the invention, similar to the client devices (client device A (122), client device N (124)), the application upgrade monitoring agent (132) may also be implemented as a logical device, as discussed above.

In one or more embodiments of the invention, the device emulation system (136) may be a system of device emulation containers (e.g., device emulation container A (220), device emulation container N (230), described below in reference to FIG. 2) that may be configured to emulate the client devices (client device A (122), client device N (124)). The emulation of the client devices (client device A (122), client device N (124)) may be used for applying the application upgrade to the emulated devices and measuring application upgrade metrics.

In one or more embodiments of the invention, the application upgrade metrics may include, but they are not limited to: the time taken to complete the application upgrade, the number of reboots required after performing the application upgrade, etc. The application upgrade metrics may also include other details not listed above without departing from the scope of the invention. Additional details regarding the device emulation system (136) are described below in reference to FIG. 2.

In one or more embodiments of the invention, the device emulation system (136) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application.

Alternatively, in one or more embodiments of the invention, similar to the client devices (client device A (122), client device N (124)), the device emulation system (136) may also be implemented as a logical device, as discussed above.

Figure 2:
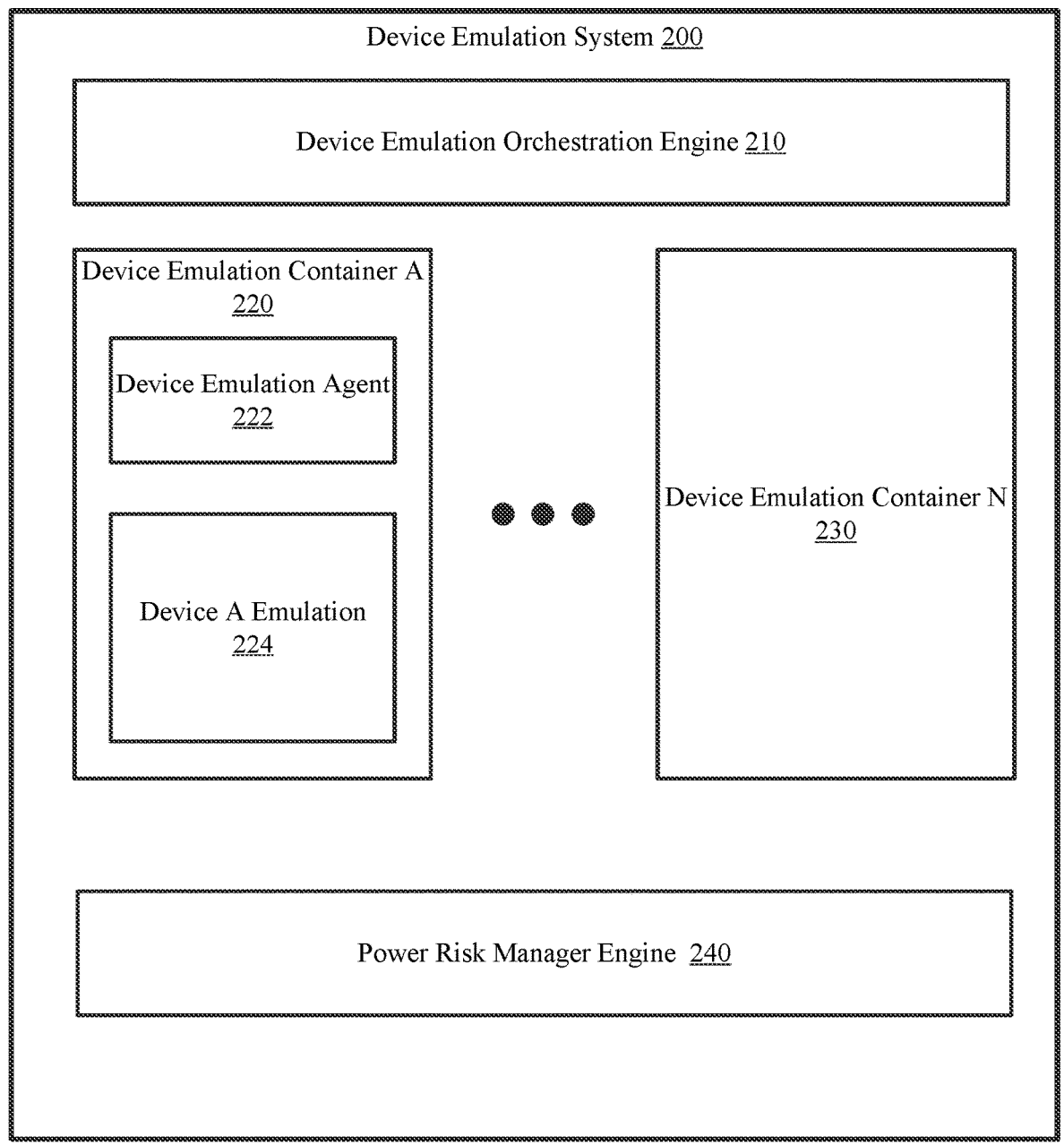
FIG. 2 shows a diagram of a device emulation system in accordance with one or more embodiments of the invention.

Turning now to FIG. 2, FIG. 2 shows a diagram of a device emulation system in accordance with one or more embodiments of the invention. The device emulation system (200) may be an example of the device emulation system (e.g., 136, FIG. 1) discussed above, in which the device emulation system (e.g., 136, FIG. 1) emulates the client devices (e.g., client device A (122), client device N (124), FIG. 1). The device emulation system (200) may include the device emulation orchestration engine (210) and one or more device emulation containers (device emulation container A (220), device emulation container N (230)). The device emulation system (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the device emulation orchestration engine (210) orchestrates the generation of the device emulation containers (device emulation container A (220), device emulation container N (230)). The emulation containers (220-230) can take the form of a sandbox where the containers have limited or no access to the operating client devices. For example, the device emulation orchestration engine (210) may receive request(s) from the application upgrade monitoring agent (e.g., 132, FIG. 1) to emulate an application upgrade on an emulated client device (e.g., device A emulation (224)). The device emulation orchestration engine (210) may then initiate the emulation of the client devices (e.g., client device A (122), client device N (124), FIG. 1) and the application upgrade.

In one or more embodiments of the invention, the device emulation orchestration engine (210) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

Alternatively, in one or more embodiments of the invention, similar to the client devices (e.g., client device A (122), client device N (124), FIG. 1), the device emulation orchestration engine (210) may also be implemented as a logical device, as discussed above, and be configured as a sandbox.

Continuing the discussion of FIG. 2, in one or more embodiments of the invention, the device emulation containers (device emulation container A (220), device emulation container N (230)) may include a device emulation agent (222) that monitors the application upgrade(s) executing on the emulated client device (device A emulation (224)). More specifically, the device emulation agent (222) may monitor, for example, the application upgrade(s) performed on the emulated client device (device A emulation (224)) to measure the time taken to perform each application upgrade and to track the number of reboots performed after each application upgrade.

In one or more embodiments of the invention, the monitored parameters may then be used to evaluate the application upgrade(s) and based on this evaluation, to determine whether the application upgrade(s) should be pushed out to the client device (e.g., client device A (122), client device N (124), FIG. 1).

In one or more embodiments of the invention, the device emulation agent (222) may perform an emulation to generate an application upgrade strategy for the emulated client device (device A emulation (224)). In one or more embodiments of the invention, the application upgrade strategy may be generated based on the available application upgrades for the client device (e.g., client device A (122), client device N (124), FIG. 1) in the application upgrade repository (e.g., 134, FIG. 1).

In one or more embodiments of the invention, the application upgrade strategy (not shown) may be generated in an iterative manner. For example, multiple application upgrade strategies may be evaluated to find the most efficient application upgrade strategy for performing the application upgrades on the emulated client device (device A emulation (224)). For this purpose, hardware capabilities of the emulated client device (device A emulation (224)), including, but not limited to, storage capability of the random-access memory, processing power of one or more processors may be considered while generating the application upgrade strategies. Other hardware capabilities of the emulated client device (device A emulation (224)) not listed above may also be considered without departing from the scope of the invention.

In one or more embodiments of the invention, the device emulation system (200) further includes a power risk manager engine (240). The power risk manager engine (240) is used by the device emulation system (200) to determined power consumption and energy efficiency. The power risk manager engine (240) can also determine from external sources the price per kwh at various times when the power is provided on a variable rate plan from a utility or due to specifics of the local power generation. The power risk manager engine (240) can also determine battery usage and capacity.

Based on earlier upgrade strategy iterations, it may be determined that specific hardware capabilities or configurations of both the hardware and applications may be important to refining the application upgrade strategy. Further for refining the application upgrade strategy, it may be determined that energy efficiency is a key identifier and needs to be considered in refining the application upgrade strategy. This key identifier, is determined and used to refine the application upgrade strategy as will now be discussed with regards to FIGS. 3A-3D

FIGS. 3A-3D show a method to determine an upgrade strategy in accordance with one or more embodiments of the invention. While the various steps in the method are presented and described sequentially, those skilled in the art will appreciate that some or all of the steps may be executed in different orders, may be combined, or omitted, and some or all steps may be executed in parallel without departing from the scope of the invention.

Figure 3A:
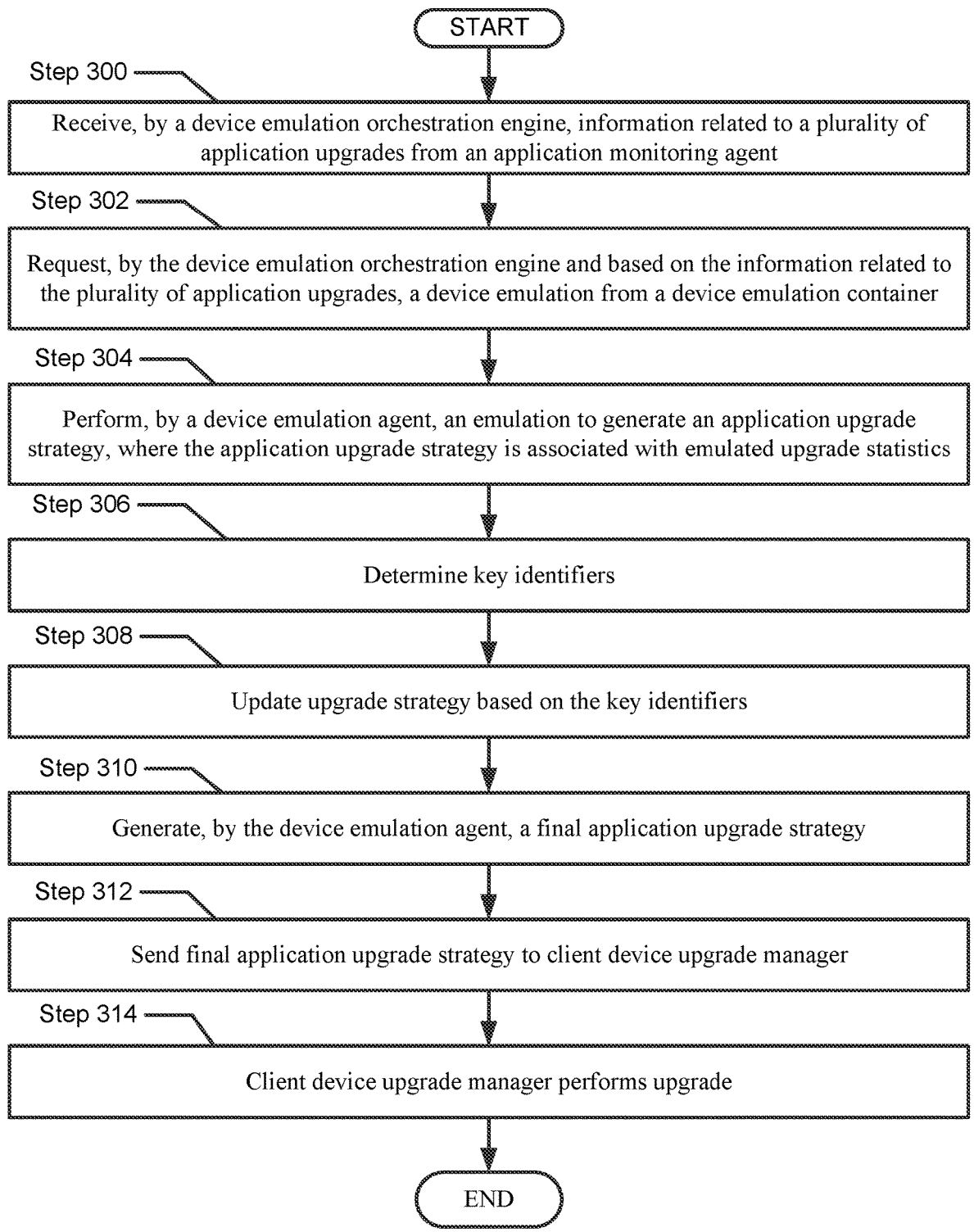
FIGS. 3A-3D show methods for determining an application upgrade strategy, energy usage, and performing energy conservation before performing the application upgrade.

Turning now to FIG. 3A, the method shown in FIG. 3A may be performed by, for example, the application upgrade monitoring agent (e.g., 132, FIG. 1), the device emulation orchestration engine (e.g., 210, FIG. 2), the device emulation container (e.g., device emulation container A (e.g., 220, FIG. 2), device emulation container N (e.g., 230, FIG. 2)), the device emulation agent (e.g., 222, FIG. 2) and the power risk manager engine (e.g., 240, FIG. 2). Other components of the system illustrated in FIG. 1 and FIG. 2, may also contribute to the performance of the method shown in FIG. 3A without departing from the scope of the invention.

In Step 300, information related to a plurality of application upgrades from an application upgrade monitoring agent is received. In one or more embodiments of the invention, the information related to the plurality of application upgrades may be received by the device emulation orchestration engine.

In one or more embodiments of the invention, prior to sending the information related to the plurality of application upgrades to the device emulation orchestration engine, the application monitoring agent may have received this information from the application upgrade repository (e.g., 134, FIG. 1). Additionally, the device configuration information of the client device that is to be upgraded using the plurality of application upgrades (e.g., a client device that requested the plurality of application upgrades) may be obtained prior to receiving the information related to the plurality of application upgrades.

In one or more embodiments of the invention, the information related to the plurality of application upgrades may include, but it is not limited to: application version information of each application upgrade, computing device information of the client device, etc. The information related to the plurality of application upgrades may also include other details not listed above without departing from the scope of the invention.

In one or more embodiments of the invention, the device configuration information of the client device may specify the configuration of the client device that requested the plurality of application upgrades. The configuration of the client device may include, for example: a current version of the operating system of the client device, the amount of memory available for the client device, a number of applications executing on the client device, the amount of available persistent storage of the client device, etc. Other types of client device configurations not listed above may also be specified in the device configuration information without departing from the scope of the invention.

In step 302, a device emulation is requested from a device emulation container. In one or more embodiments of the invention, based on the information related to the plurality of application upgrades, the device emulation may be requested by the device emulation orchestration engine.

In one or more embodiments of the invention, the device emulation request may specify applying the plurality of application upgrades to an emulated device of a corresponding client device. The device emulation request may also specify monitoring the installation of the plurality of application upgrades to obtain the application upgrade metrics. Other tasks not listed above may also be specified in the device emulation request without departing from the scope of the invention. Details regarding the application upgrade metrics are described above in reference to FIG. 1.

In one or more embodiments of the invention, while performing the device emulation of the corresponding client device, a set of upgrade estimations for each application upgrade may be obtained from the device emulation agent. The set of upgrade estimations may specify, for example, an estimated completion time for each application upgrade to be applied to the client device. In one or more embodiments of the invention, the set of upgrade estimations may further specify the number of restarts required after all application upgrades have been applied. Other parameters not listed above may also be specified by the set of upgrade estimations without departing from the scope of the invention. The set of upgrade estimations may then be provided to the device emulation orchestration engine.

Continuing the discussion of FIG. 3A, in step 304, an emulation to generate an application upgrade strategy is performed by the device emulation orchestration engine. In one or more embodiments of the invention, the emulation to generate the application upgrade strategy may be performed by the device emulation agent. During the generation of the application upgrade strategy, the set of upgrade estimations and the application upgrade metrics may be considered.

To generate the emulation, the client device emulation may obtain application logs and system logs of the emulated client device. In one or more embodiments of the invention, the application logs may include, but are not limited to: information related to a task scheduler history, information related to a domain name system (DNS) change, etc. Further information on the system such as battery usage, storage device capacity, etc. may be obtained along with the system logs that may include, but are not limited to: information related to a client device's CPU usage, information related to a newly detected universal serial bus (USB) device, etc.

In one or more embodiments of the invention, based on the obtained application logs and the system logs, the OS of the client device emulation may access the various logs and telemetry of the system to emulate the system and the application upgrade. This information may then be provided to the device emulation agent.

In Step 306, the key identifiers are determined. As discussed more with regards to the method of FIG. 3B, the key identifiers are obtained based on the emulated upgrade strategy and device telemetry. The key identifiers are characteristics of the system that are most pertinent to the upgrade strategy.

An example of a key identifier would be the amount of battery time left, if the upgrade strategy is such that the upgrade would require a significant un-interrupted time for performing the upgrade. For example, if the upgrade strategy found that the upgrade needed two hours of uninterrupted time, and the key identifier of battery reserves show that only one hour of battery power was left, then the system would conclude that the upgrade strategy would need to be altered as discussed in step 308 to be performed in less than one hour.

An additional key identifier in one or more embodiments of the invention, is projection energy consumption. This projected energy consumption, is discussed in more detail with regards to FIGS. 3B-3D below. The projected energy consumption can be determined in one or more embodiments of the invention based on the estimated upgrade time and energy user based at least in part of the client device telemetry.

Other key identifiers can be used instead or in addition to one or more embodiments of the invention. One such key identifier would be the amount of storage left on a storage drive. Another key identifier according to one or more embodiments of the invention, would be system usage (for example if the system is used at 90% capacity at 10 a.m. but only 10% capacity at 1 a.m., then it may be desirous to have the upgrade strategy include having the upgrade performed at 1 a.m. instead of at 10 a.m.). Other key identifiers such as network capacity, processor capacity, critical applications, etc. not described in more detail herein can also be considered.

In step 308, the upgrade strategy is updated based on the key identifiers. Once the key identifiers are determined including the projected energy consumption, as discussed above and in more detail with regards to the method of FIG. 3B, the device emulation agent updates the upgrade strategy to take into account the projected energy consumption as well as any other of the key identifiers. This can be done once, or over a predetermined period. In one or more embodiments of the invention this can be done continuously until the upgrade is actually started.

In Step 310, a final application upgrade strategy is generated. In one or more embodiments of the invention, the device emulation agent may generate the final application upgrade strategy. The final application upgrade strategy may include the key identifier as discussed above in step 308 and other information such as boot time delay(s), user input can also be used in developing the final upgrade strategy.

Once the final upgrade strategy is determined, it is sent in step 312 to the upgrade manager. The upgrade manager in one or more embodiments of the invention can be part 100 of FIG. 1. The upgrade manager maintains the upgrade strategy and in one or more embodiments of the invention updates the upgrade strategy as key identifiers and other issues related to the upgrade change. In step 314, once the conditions of the final upgrade strategy and/or based on user/administrator preference the upgrade manager performs the upgrade according to the upgrade strategy and the method ends.

Figure 3B:
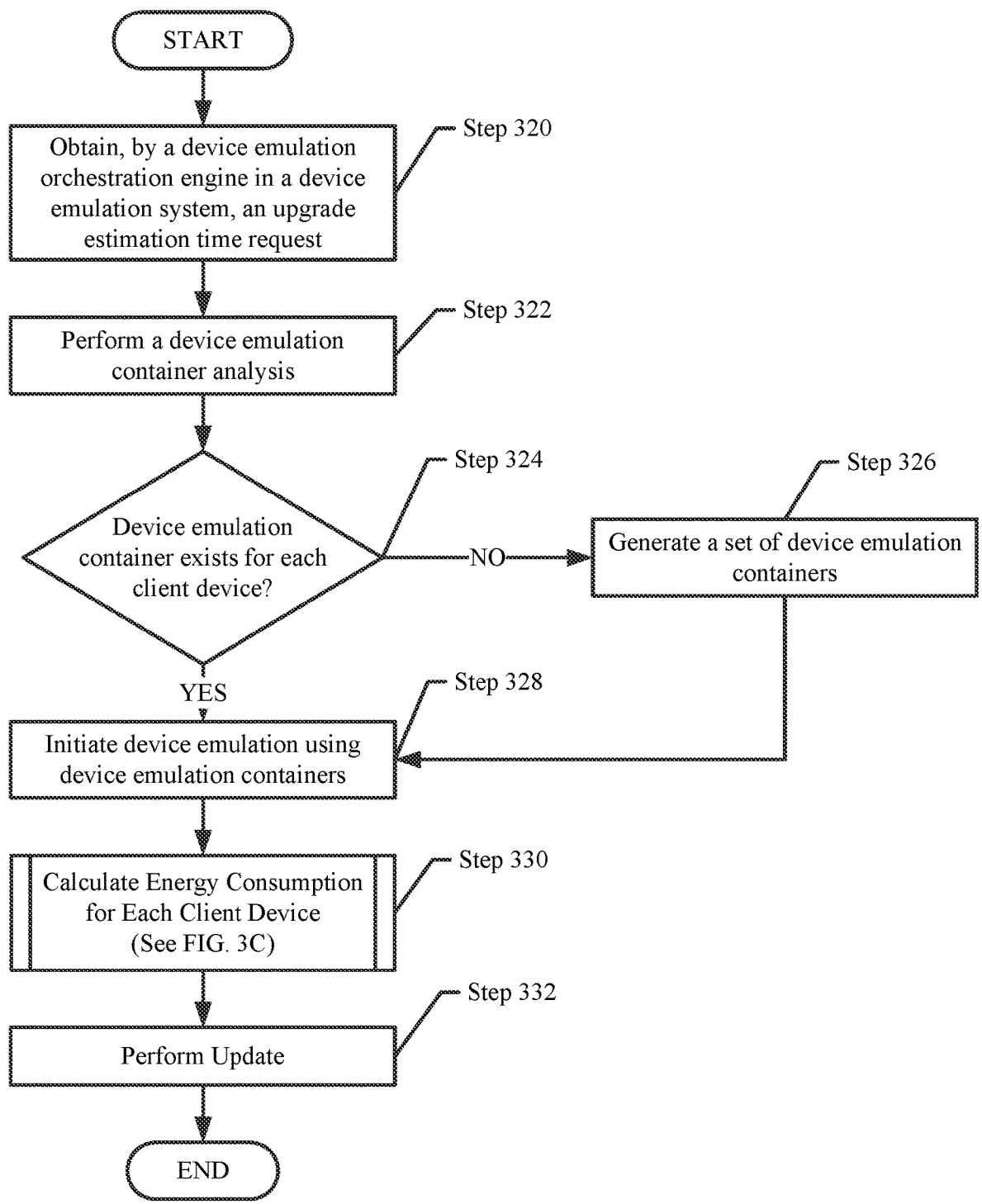

Turning now to FIG. 3B, the method shown in FIG. 3B may be performed by, for example, the application upgrade monitoring agent (e.g., 132, FIG. 1), the device emulation orchestration engine (e.g., 210, FIG. 2), the device emulation agent (e.g., 222, FIG. 2), the client device upgrade manager (e.g., 100, FIG. 1), and the power risk manager engine (e.g., 240, FIG. 2). Other components of the system illustrated in FIG. 1 and FIG. 2 may also contribute to the performance of the method shown in FIG. 3B without departing from the scope of the invention.

In step 320, the device emulation system and in one or more embodiments of the invention specifically in the device emulation orchestration engine, an upgrade estimation time request. In one or more embodiments of the invention, it is generated as part of the application upgrade strategy produced in step 304 of FIG. 3A. In one or more other embodiments of the invention, this time request may be calculated based on metadata or other aspects of the upgrade.

Once the upgrade estimation time is obtained, in step 322, the device emulation system performs a device emulation container analysis and determines in step 324 if a container exists for each client device. If the device emulation containers do not exist in step 326 a set of device emulation containers is generated for each client device that is to be upgraded in accordance with the upgrade strategy. These containers can take the form of a sandbox which will protect actual user device from unintended or harmful consequences of the emulation.

Once a set of device emulation containers exits for each client device the method proceeds to step 328, where the device emulation is performed using the device emulation containers and in step 330 the energy consumption for each client device is determined as will be discussed in more detail with regards to FIG. 3C below.

Figure 3C:
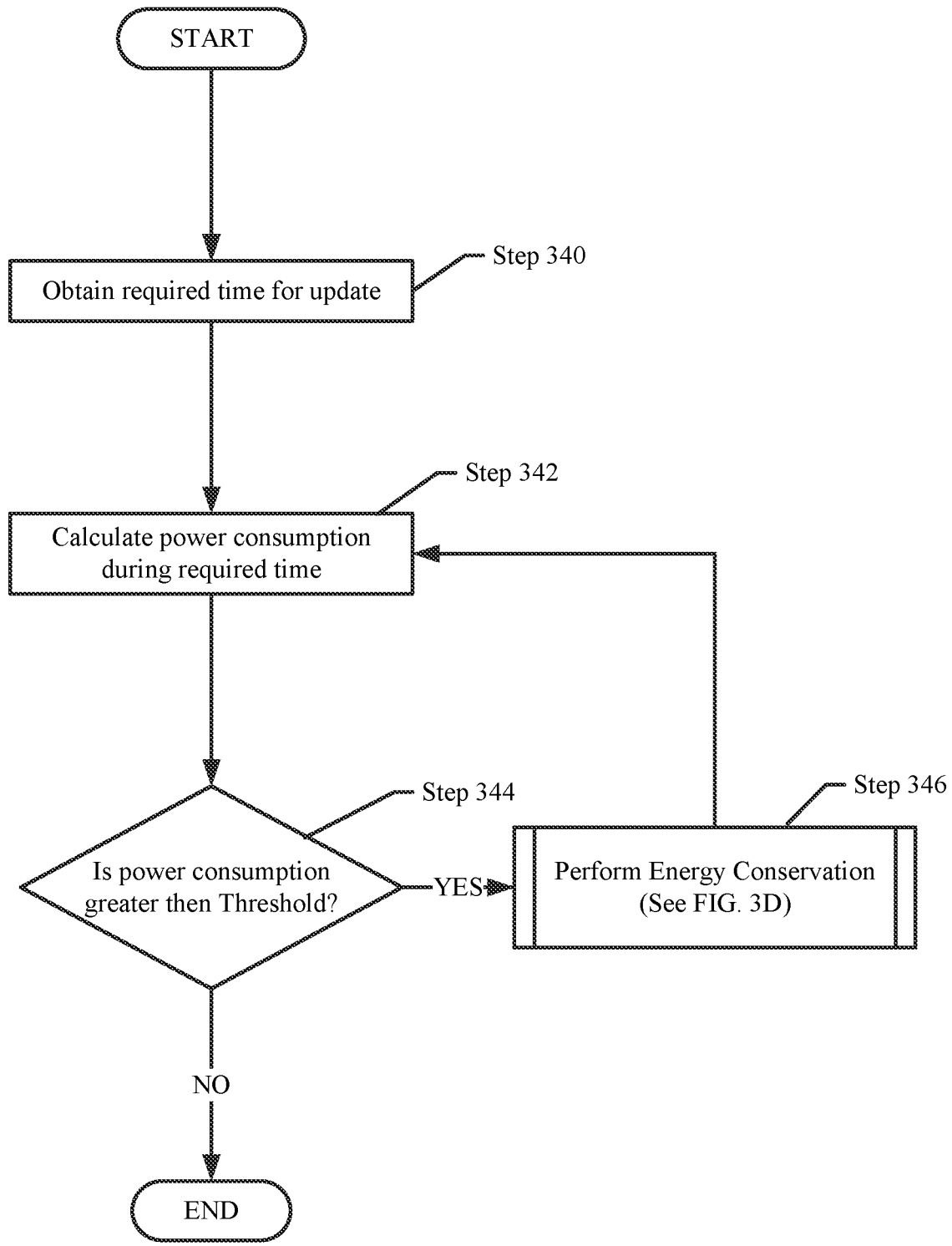

Once energy consumption for each client device is obtained and the upgrade/update strategy is adjusted with regards to at least energy consumption and energy conservation (see FIGS. 3C and 3D), the method performs the update in step 332 and the method of FIG. 3B ends Turning now to FIG. 3C, the method shown in FIG. 3C performs step 330 of FIG. 3B and calculates the energy consumption for each client device and may be performed by, for example, the application upgrade monitoring agent (e.g., 132, FIG. 1), the device emulation orchestration engine (e.g., 210, FIG. 2), the device emulation agent (e.g., 222, FIG. 2), the client device upgrade manager (e.g., 100, FIG. 1), and the power risk manager engine (e.g., 240, FIG. 2). Other components of the system illustrated in FIG. 1 and FIG. 2, may also contribute to the performance of the method shown in FIG. 3C without departing from the scope of the invention. The method of FIG. 3C can be performed individually for each device emulation container or performed on a characteristic container or for all containers at the same time.

In step 340, the device emulation system obtains the required time for the update which was previously calculated. This required time can be solely based on software to be updated or can include other characteristics of the client device as determined by the device emulation system.

Using the required time for the update, the method can calculate in step 342 the power that would be consumed during this time. In one or more embodiments of the invention, this can be calculated by obtaining device telemetry which can give an average amount of power used per unit of time, or with more detailed analysis showing the change of power used based on diverse options and procedures performed by the device. Using the amount of power used per unit of time, the device emulation system in one or more embodiments of the invention can then determine how much the total power consumption would be based on the current upgrade strategy.

In step 344, the method determines if the power consumption calculated in step 342 is greater than a threshold. A user or administrator can set the threshold. Alternatively, it can be based on the current cost of electricity and a set budget. Other means for setting the threshold can be considered in accordance with one or more embodiments of the invention. Once the power consumption is below the threshold the method ends.

If in step 344, the method according to one or more embodiments of the invention, is determined the power consumption is greater than a threshold, then the method proceeds to step 346, to perform energy conservation, which is described in more detail below with regards to the method of FIG. 3D. Once energy conservation is performed the method returns to step 342, and a new power consumption is calculated based on a refined upgrade strategy.

Figure 3D:
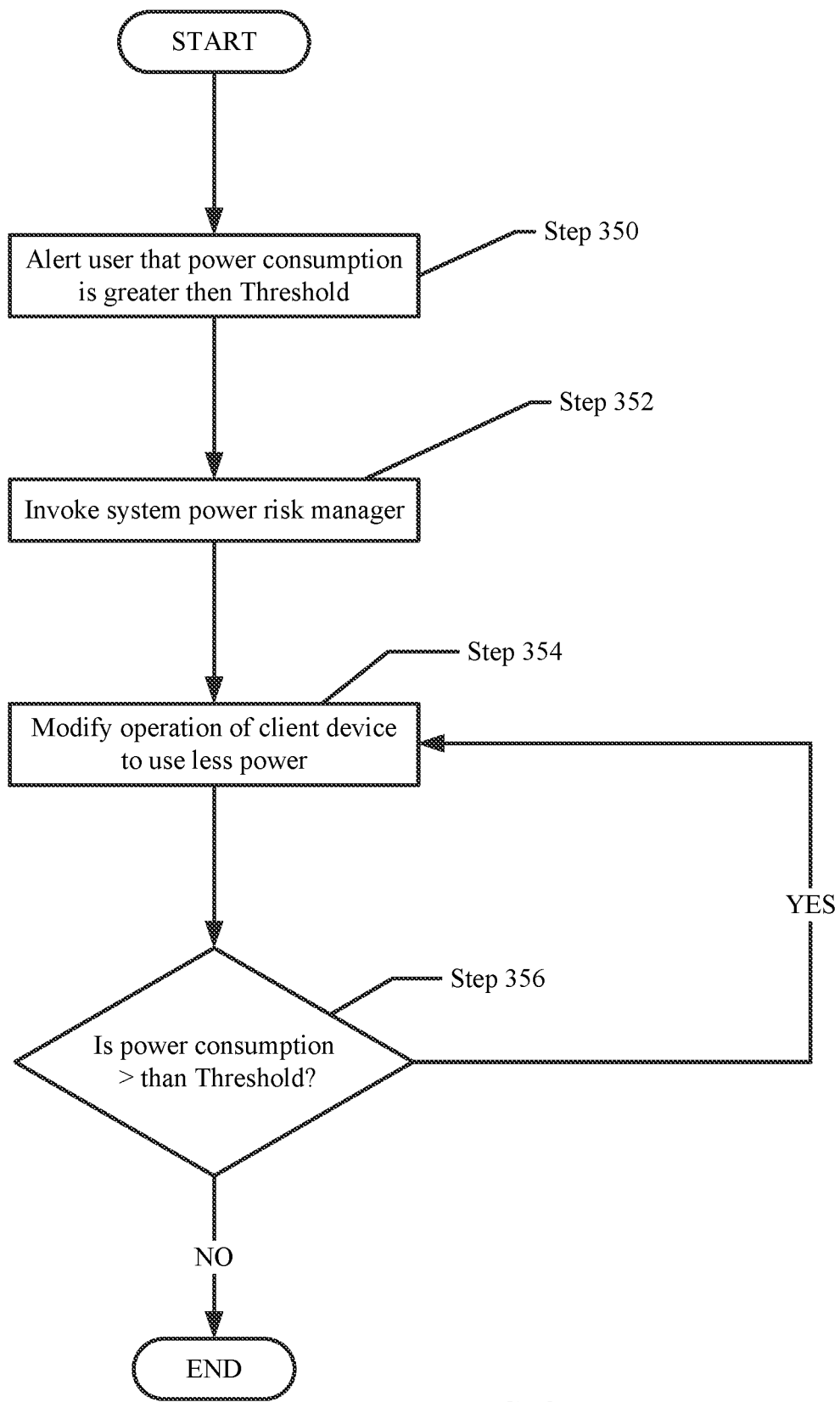

Turning now to FIG. 3D, the method shown in FIG. 3D may be performed by, for example, the application upgrade monitoring agent (e.g., 132, FIG. 1), the device emulation orchestration engine (e.g., 210, FIG. 2), the device emulation agent (e.g., 222, FIG. 2), the client device upgrade manager (e.g., 100, FIG. 1), and the power risk manager engine (e.g., 240, FIG. 2). Other components of the system illustrated in FIG. 1 and FIG. 2 may also contribute to the performance of the method shown in FIG. 3B without departing from the scope of the invention.

In step 350, the method in one or more embodiments of the invention alerts a user or administrator that power consumption is greater than the threshold as determined in the method of FIG. 3C. The user or administrator may be alerted on a graphical user interface of a client device. Alternatively, the system could alert a manufacture or a third party, so appropriate action can be taken.

In other embodiments of the invention the method of FIG. 3D may skip step 350 and start with step 352 and not alert a user. In these embodiments the energy conservation is performed automatically with no user input or notification.

Step 352 of the method comprises of invoking the system power risk manager (e.g., 204, FIG. 2). The power risk manager is used to calculate and modify operation of the client device and/or the upgrade strategy to decrease the power consumption. Other uses as outlined above for the power risk manager are also considered. Other devices of FIGS. 1 and 2 can be invoked instead of the power risk manager (240)

In step 354 the power risk manager or other component of the system, modifies the operation of the client device to use less power. In one or more embodiments of the invention this can comprise of closing one or more process, deleting unwanted cache, and other data that use excess power. In other embodiments of the invention this can comprise of altering the operation of one or more physical components of the client device to decrease power consumption. In one or more embodiments of the invention, the user or administrator chooses what actions to perform to decrease the power consumption. In other embodiments of the invention, the power risk manager automatically modifies the operation of the client device to obtain a desire level of power consumption.

Once the power consumption of the client device is decreased in step 354, the method determines in step 356, if the power consumption for the potential update still greater than a threshold. If yes, the method returns to step 354 to decrease the amount of power used by the client device by more. If no, the method ends, and the update can be performed as described in FIG. 3A.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many diverse types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of this invention may improve the operating and upgrading of computing devices and system. More specifically one or more embodiments of the invention may receive information related to a plurality of application upgrades from an application monitoring agent. Based on the received information, a device emulation will be requested, and an emulation will be performed in response to generate an application upgrade strategy along including such things as emulated (e.g., predicted) upgrade times. The various embodiments refine the upgrade strategy by specifically consider the power consumption and cost for the power that is consumed.

In response to the upgraded strategy as well as user or administrator feedback, the final application upgrade strategy will be initiated (e.g., instantiated, executed, etc.). This advantageously allows for the upgrade process to be customized to a particular electronic device/system resulting in less inconvenience and costs with performing the upgrade. One or more embodiments of the invention further provide the advantage of allowing a user or administrator to have a much clearer view about the upgrade process and allow them to customize both the upgrade and the system. These and other features of the various embodiments of the invention will increase the likelihood that an upgrade will be performed and completed successfully in a timely manner.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for upgrading a client device, the method comprising:
   obtaining an upgrade estimation time request associated with an application upgrade on the client device using a device emulation orchestration engine in a device emulation system, wherein the device emulation orchestration engine and the client device are operably connected to each other over a combination of wired and wireless connections, wherein the device emulation orchestration engine is executing on a first computing device (CD) that comprises at least a first integrated circuitry (IC) that performs services for a second CD, wherein the client device is the second CD that comprises at least a second IC that provides services to a user;
   in response to the upgrade estimation time request:
   performing a device emulation analysis using the device emulation orchestration engine to determine an application upgrade strategy for the application upgrade, wherein the application upgrade strategy comprises an upgrade estimation time and wherein the application upgrade strategy is generated based on available application upgrades for the client device in a repository and key identifiers associated with the client device that specify network capacity and critical applications of the client device;
   performing, using the upgrade estimation time, an energy use calculation for the client device using the device emulation orchestration engine to generate a projected energy consumption;
   making a first determination that the projected energy consumption is greater than a threshold, wherein the user is alerted using a graphical user interface (GUI) to indicate that the projected energy consumption is greater than the threshold;
   performing, based on the first determination, energy conservation on the client device by modifying an operation of at least a portion of the client device and the application upgrade strategy to attempt to decrease the energy use of the client device below the threshold;
   making a second determination, based on performing energy conversation on the client device, that the projected energy consumption is less than the threshold; and
   initiating, based on the second determination, the application upgrade strategy on the client device, wherein the application upgrade strategy specifies a boot time delay and the key identifiers associated with the client device comprise the network capacity and the critical applications of the client device.

2. The method of claim 1, wherein performing the energy conservation further comprises:
   invoking a system power risk manager, wherein the system power risk manager is configured to orchestrate a modification of the operation of at least the portion of the client device.

3. The method of claim 1, wherein the device emulation analysis comprises:
   using a device emulation container for the client device.

4. The method of claim 1, wherein the generating the projected energy consumption comprises:
   periodically repeating the energy use calculation until the application upgrade strategy is completed.

5. A non-transitory computer readable medium comprising computer readable program code, which when executed by a computer processor enables the computer processor to perform a method for upgrading a client device, the method comprising:
   obtaining an upgrade estimation time request associated with an application upgrade on the client device using a device emulation orchestration engine in a device emulation system, wherein the device emulation orchestration engine and the client device are operably connected to each other over a combination of wired and wireless connections, wherein the device emulation orchestration engine is executing on a first computing device (CD) that comprises at least a first integrated circuitry (IC) that performs services for a second CD, wherein the client device is the second CD that comprises at least a second IC that provides services to a user;

in response to the upgrade estimation time request:

performing a device emulation analysis using the device emulation orchestration engine to determine an application upgrade strategy for the application upgrade, wherein the application upgrade strategy comprises an upgrade estimation time and wherein the application upgrade strategy is generated based on available application upgrades for the client device in a repository and key identifiers associated with the client device that specify network capacity and critical applications of the client device;

performing, using the upgrade estimation time, an energy use calculation for the client device using the device emulation orchestration engine to generate a projected energy consumption;

making a first determination that the projected energy consumption is greater than a threshold, wherein the user is alerted using a graphical user interface (GUI) to indicate that the projected energy consumption is greater than the threshold;

performing, based on the first determination, energy conservation on the client device by modifying an operation of at least a portion of the client device and the application upgrade strategy to attempt to decrease the energy use of the client device below the threshold;

making a second determination, based on performing energy conversation on the client device, that the projected energy consumption is less than the threshold; and initiating, based on the second determination, the application upgrade strategy on the client device, wherein the application upgrade strategy specifies a boot time delay and the key identifiers associated with the client device comprise the network capacity and the critical applications of the client device.

6. The non-transitory computer readable medium of claim 5, wherein performing the energy conservation further comprises:

invoking a system power risk manager, wherein the system power risk manager is configured to orchestrate a modification of the operation of at least the portion of the client device.

7. The non-transitory computer readable medium of claim 5, wherein the device emulation analysis comprises:

using a device emulation container for the client device.

8. The non-transitory computer readable medium of claim 5, wherein the generating the projected energy consumption comprises:

periodically repeating the energy use calculation until the application upgrade strategy is completed.

9. A system comprising:

a client environment comprising a client device; and a production host environment comprising a device emulation orchestration engine and memory, wherein the device emulation orchestration engine and the client device are operably connected to each other over a combination of wired and wireless connections, wherein the device emulation orchestration engine is a first computing device (CD) that comprises at least a first integrated circuitry (IC) that performs services for a second CD, wherein the client device is the second CD that comprises at least a second IC that provides services to a user, wherein the memory comprises instructions, which when executed perform a method, the method comprising:

obtaining an upgrade estimation time request associated with an application upgrade on the client device using the device emulation orchestration engine;

in response to the upgrade estimation time request:

performing a device emulation analysis using the device emulation orchestration engine to determine an application upgrade strategy for the application upgrade, wherein the application upgrade strategy comprises an upgrade estimation time and wherein the application upgrade strategy is generated based on available application upgrades for the client device in a repository and key identifiers associated with the client device that specify network capacity and critical applications of the client device;

performing, using the upgrade estimation time, an energy use calculation for the client device using the device emulation orchestration engine to generate a projected energy consumption;

making a first determination that the projected energy consumption is greater than a threshold, wherein the user is alerted using a graphical user interface (GUI) to indicate that the projected energy consumption is greater than the threshold;

performing, based on the first determination, energy conservation on the client device by modifying an operation of at least a portion of the client device and the application upgrade strategy to attempt to decrease the energy use of the client device below the threshold;

making a second determination, based on performing energy conversation on the client device, that the projected energy consumption is less than the threshold; and initiating, based on the second determination, the application upgrade strategy on the client device, wherein the application upgrade strategy specifies a boot time delay and the key identifiers associated with the client device comprise the network capacity and the critical applications of the client device.

10. The system of claim 9, further comprising a system power risk manager, and wherein performing energy conservation further comprises:

invoking a system power risk manager, wherein the system power risk manager is configured to orchestrate a modification of the operation of at least the portion of the client device.

11. The system of claim 9, wherein the generating the projected energy consumption comprises:

periodically repeating the energy use calculation until the application upgrade strategy upgrade is completed.

* * * * *